US012750072B2

(12) United States Patent
Sahin

(10) Patent No.: US 12,750,072 B2
(45) Date of Patent: Sep. 29, 2026

(54) WAVEFORM-TRIGGERED RECEPTION AND BUFFERING FOR MILLIMETER-WAVE SOFTWARE-DEFINED RADIOS

(71) Applicant: UNIVERSITY OF SOUTH CAROLINA, Columbia, SC (US)

(72) Inventor: Alphan Sahin, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 392 days.

(21) Appl. No.: 18/495,285

(22) Filed: Oct. 26, 2023

(65) Prior Publication Data

US 2024/0235580 A1 Jul. 11, 2024

Related U.S. Application Data

(60) Provisional application No. 63/438,021, filed on Jan. 10, 2023.

(51) Int. Cl.
*H04B 1/00* (2006.01)
*H04B 1/30* (2006.01)

(52) U.S. Cl.
CPC ............. *H04B 1/0032* (2013.01); *H04B 1/30* (2013.01)

(58) Field of Classification Search
CPC ....... H04B 1/0032; H04B 1/30; H04B 1/0003
See application file for complete search history.

(56) References Cited

U.S. PATENT DOCUMENTS

2009/0094495 A1 * 4/2009 Torin ..................... G01R 23/16 324/555
2024/0280682 A1 * 8/2024 Zhang ..................... G01S 13/48

OTHER PUBLICATIONS

Zhao et al. "M-Cube: A millimeter-wave massive MIMO software radio," in *Proc. ACM MobiCom*, New York, NY, USA, 2020.
Cehn et al. "Programmable and open-access millimeter-wave radios in the Pawr Cosmos testbed," in *Proc. ACM WiNTECH*, New York, NY, USA, 2021, pp. 1-8.
Lacruz et al. "A real-time experimentation platform for sub-6 GHz and millimeter-wave MIMO systems," in *Proc. ACM MobiSys*, New York, NY, USA, 2021, pp. 427-439.
(Continued)

*Primary Examiner* — Ayodeji O Ayotunde
(74) *Attorney, Agent, or Firm* — Dority & Manning, P.A.

(57) ABSTRACT

The disclosure deals with methodology and system subject matter for a low-cost and portable millimeter-wave software-defined radio (SDR) which supports wireless experimentation in the 60 GHz band. The SDR uses a homodyne transceiver and provides a Transmission Control Protocol/Internet Protocol (TCP/IP)-based interface for companion computer (CC)-based baseband signal processing. To address the large difference between the processing speed of the CC and the sample rate of analog-to-digital converters, we use a disclosed method, called waveform-triggered reception (WTR), where a hard-coded block detects a special trigger waveform to acquire a predetermined number of in-phase/quadrature (IQ) data samples upon the detection. A buffer mechanism is used to support discontinuous transmissions. Using both the WTR and discontinuous transmissions, we can conduct a beam sweeping experiment, to evaluate 4096 beam pairs rapidly without compromising the flexibility of the CC-based processing.

31 Claims, 13 Drawing Sheets

(56) References Cited

OTHER PUBLICATIONS

Santhi et al. "An end-to-end programmable testbed for the experimental evaluation of video streaming at mm Waves," in *Proc. IEEE GLOBECOM Workshops—Workshop on High Capacity Wireless Communications*, Dec. 2022, pp. 1-6.
Zavorka et al. "Deep neural network-based human activity classifier in 60 GHz WLAN channels," in *Proc. IEEE GLOBECOM Workshops—Workshop on Propagation Channel Models and Evaluation Methodologies for 6G*, Dec. 2022, pp. 1-6.
Sim et al. "60 GHz mm Wave full-duplex transceiver study and over-the-air link verification," in *Proc. IEEE GLOBECOM*, Dec. 2022, pp. 1-6.
Alphan Sahin "A demonstration of over-the-air-computation for Feel," in *Proc. IEEE GLOBECOM Workshops—Workshop on Wireless Communications for Distributed Intelligence*, Dec. 2022, pp. 1-6.

* cited by examiner

WAVEFORM-TRIGGERED RECEPTION AND BUFFERING FOR MILLIMETER-WAVE SOFTWARE-DEFINED RADIOS

PRIORITY CLAIM

The present application claims the benefit of priority of U.S. Provisional Patent Application No. 63/438,021, titled Waveform-Triggered Reception and Buffering for Millimeter-Wave Software-Defined Radios, filed Jan. 10, 2023, and which is fully incorporated herein by reference for all purposes.

STATEMENT REGARDING SPONSORED RESEARCH OR DEVELOPMENT

This invention was made with government support under Grant Number SPN0002555, awarded by the National Science Foundation. The government has certain rights in the invention.

BACKGROUND OF THE PRESENTLY DISCLOSED SUBJECT MATTER

I. Introduction

Millimeter-wave (mmWave) communications is one of the key enablers for high-throughput systems by allowing directive links over a large bandwidth. While there has been extensive research activity for mm Wave systems, experimentation in real-world environments is still a major challenge due to the lack of low-cost and portable mm Wave software-defined radios (SDRs), as compared to the ones for sub-6 GHz. In this disclosure, we address this issue with a new SDR solution.

In the literature, there is a substantial interest in developing mmWave SDRs. For example, in [1], an SDR with multiple phased-antenna arrays (PAAs) is proposed by hijacking a commercial IEEE 802. IIad radio. In [2], mmWave transceivers from Sivers, IBM, and InterDigital are evaluated to be paired with universal software-radio peripherals (USRPs) or Xilinx ZCUI 11 for COSMOS testbed. In this disclosure, the SDR functionality relies on USRPs, where the signal bandwidth is significantly lower than the typical values in a mmWave band. In [3], four 60 GHz PAAs are connected to Xilinx ZCUII 1, where the design particularly focuses on the implementation of IEEE 802.1 lad in the field-programmable gate array (FPGA). In [4], ZCUII 1 is utilized with the discrete circuits for a wireless sensing application. In [5], Ni's mmWave solution along with SiBeam PAAs is considered for video transmission. In [6], a full-duplex system is demonstrated by using custom boards. Although the proposed designs in [4]-[6] are complete solutions, the introduced platforms can be costly and not trivial to make them portable in practice.

Existing solutions in some instances use either a complete FPGA design (which compromises the flexibility of the SDR) or in some other instances use exhaustive correlators at the companion computer (which causes a heavy computation burden).

Millimeter-wave (mmWave) communications is one of the key enablers for high-throughput systems by allowing directive links over a large bandwidth. While there has been extensive research activity for mmWave systems, experimentation in real-world environments is still a major challenge due to the lack of low-cost and portable mmWave software-defined radios (SDRs), as compared to the ones for sub-6 GHz. One of the problems is the large difference between the sample rate of the analog-to-digital converter (ADC) and the processing speed of the companion computer (CC) in mmWave systems. It is very challenging to find the transmitted signals via a host-based signal processing when the signals are transmitted so quickly (in the level microseconds). Our presently disclosed subject matter addresses this problem and finds the signals without continuously monitoring the signal at the CC.

In this disclosure, with the motivations of developing a portable, low-cost, and easy-to-construct mmWave SDR, we disclose a set of SDR solutions and build a mmWave SDR equipped with such solutions to support the effectiveness of the presently disclosed methods.

The presently disclosed subject matter offers competitive advantages over prior approaches by maintaining the flexibility of the companion computer (CC)-based baseband signal processing even if the sample rate of the SDR is extremely large. This reduces the need for fast CC and effectively reduces the cost of the SDR. It also enables practical tests, design, research, and measurement in millimeter bands as it leads to portable and low-cost mmWave SDRs.

SUMMARY OF THE PRESENTLY DISCLOSED SUBJECT MATTER

The presently disclosed methodologies and corresponding and/or associated systems relate broadly to improved software-defined radio (SDR) subject matter, and more particularly to millimeter-wave SDRs. Some presently disclosed embodiments may further relate to waveform-triggered reception and/or buffering features used for implementing improved millimeter-wave SDRs.

In some aspects of some of the exemplary embodiments of the presently disclosed subject matter, we address the large difference between the processing speed of a companion computer (CC) of an SDR and the sample rate of the corresponding analog-to-digital converters in the SDR, particularly for millimeter-wave software-defined radios (SDRs). Further, for some presently disclosed exemplary embodiments, we disclose a method, called waveform-triggered reception (WTR), where a hard-coded block detects a special trigger waveform to acquire a predetermined number of in-phase/quadrature (IQ) data samples upon the detection.

For some other exemplary embodiments, we also introduce a buffer mechanism to support discontinuous transmissions. Such exemplary innovation substantially improves the flexibility of an SDR as it reduces the computation burden at the CC.

For some of the embodiments herewith for constructing mmWave SDRs, we disclose a set of SDR solutions and build a mmWave SDR equipped with one or more of the following solutions to demonstrate the effectiveness of the disclosed methodologies:

Waveform-triggered reception: To maintain the flexibility of the companion computer (CC)-based baseband signal processing and address the large difference between the sample rate of the analog-to-digital converter (ADC) and the CC's processing speed, we disclose waveform-triggered reception (WTR), where an intellectual property (IP) (or IP core, a functional block of logic or data used to make a field-programmable gate array (FPGA) or application-specific integrated circuit or integrated circuit (IC) layout design) that detects a special trigger waveform and passes a predetermined number of in-phase/quadrature (IQ) data samples followed by the trigger waveform to the programmable system (PS). Hence, WTR paves the way for the reception of any waveform desired to be communicated between the SDRs while substantially reducing the load on the interface between CC and SDR.

A buffer method for discontinuous transmissions: By exploiting WTR, we introduce a buffer mechanism that automatically stores the IQ data in a discontinuous manner. While this feature improves the resource utilization in the FPGA, it enables fast CC-based beam sweeping. This feature may be used for achieving fast beam sweeping.

One exemplary embodiment disclosed herewith relates to methodology for a millimeter-wave software-defined radio, comprising receiving an analog signal corresponding to a radio frequency waveform; converting the analog signal to a digital signal corresponding to the radio frequency waveform; acquiring data samples from the radio frequency waveform in a first mode of operation; monitoring data samples from the radio frequency waveform for detecting a predetermined trigger waveform within the radio frequency waveform; producing a triggering signal whenever the predetermined waveform is detected; and acquiring data samples from the radio frequency waveform in a second mode of operation whenever the triggering signal is produced.

It is to be understood that the presently disclosed subject matter equally relates to associated and/or corresponding systems and apparatus.

Other example aspects of the present disclosure are directed to systems, apparatus, tangible, non-transitory computer-readable media, user interfaces, memory devices, and electronic devices for mmWave SDRs. To implement methodology and technology herewith, one or more processors may be provided, programmed to perform the steps and functions as called for by the presently disclosed subject matter, as will be understood by those of ordinary skill in the art.

One exemplary such embodiment relates to a millimeter-wave software-defined radio (SDR), comprising at least one antenna for receiving an analog signal corresponding to a radio frequency waveform; at least one analog to digital converter (ADC) converting the analog signal to a digital signal corresponding to the radio frequency waveform; one or more processors programmed for: acquiring data samples from the radio frequency waveform in a first mode of operation; monitoring data samples from the radio frequency waveform for detecting a predetermined trigger waveform within the radio frequency waveform; producing a triggering signal whenever the predetermined waveform is detected; and acquiring data samples from the radio frequency waveform in a second mode of operation whenever the triggering signal is produced.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 1(*b*) is an image of an example of the implemented SDR as represented in FIG. 1(*a*), with the subject mmWave radio used with a 12-V battery;

Figure 1A:
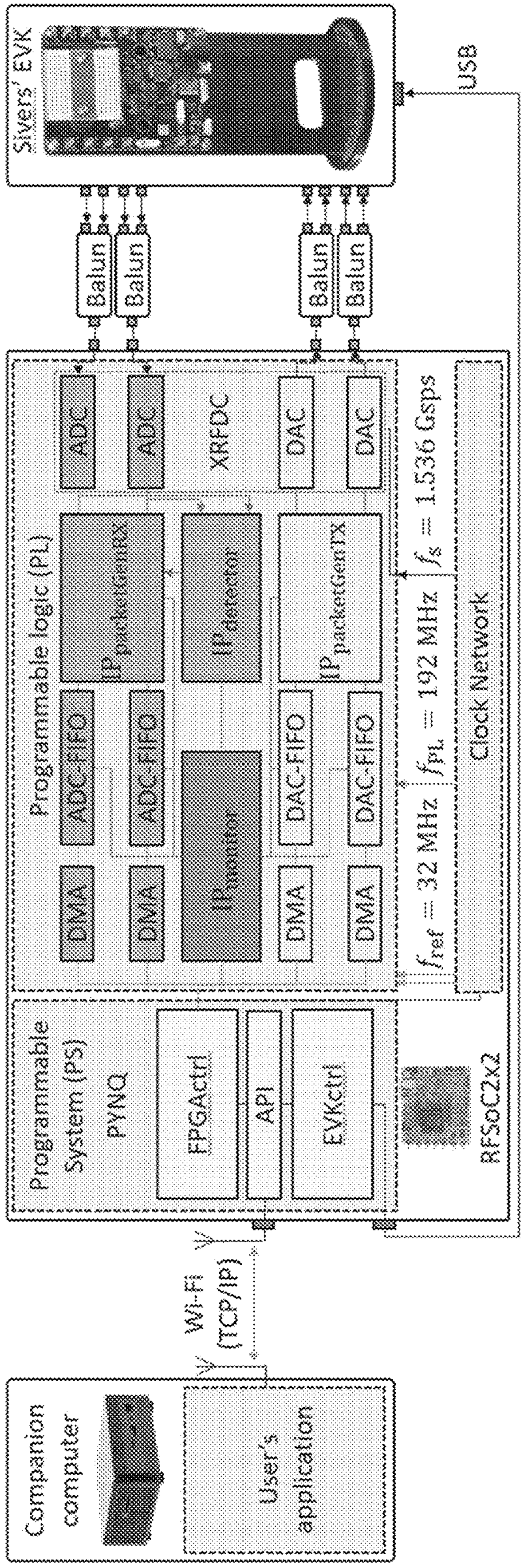
FIG. 1(*a*) illustrates an exemplary block diagram of architecture of an exemplary embodiment of a mmWave software-defined radio (SDR) in accordance with presently disclosed subject matter.

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to method and system which comprises improved millimeter-wave software-defined radio (SDR) subject matter.

II. Architecture of the Mmwave SDR

Figure 1B:
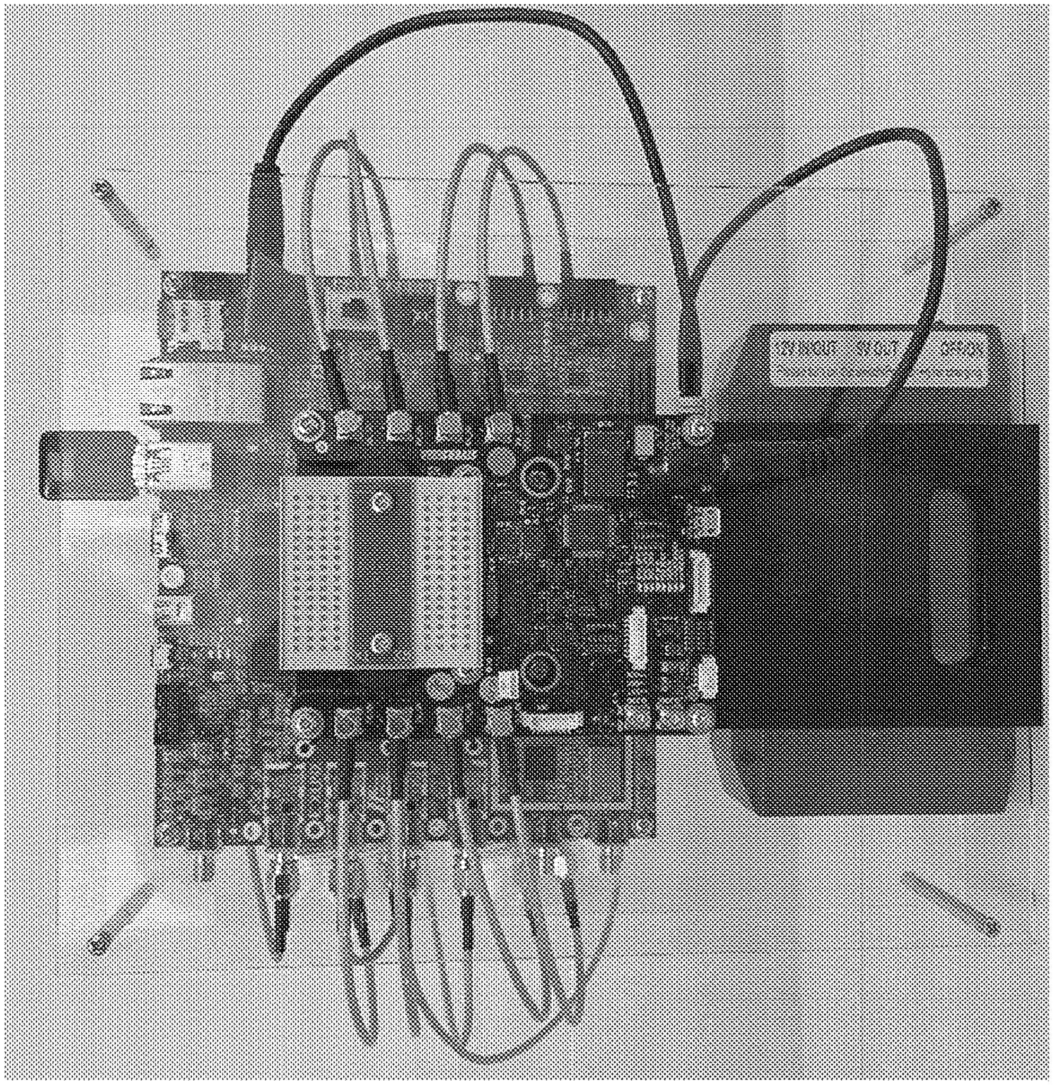
Figure 2A:
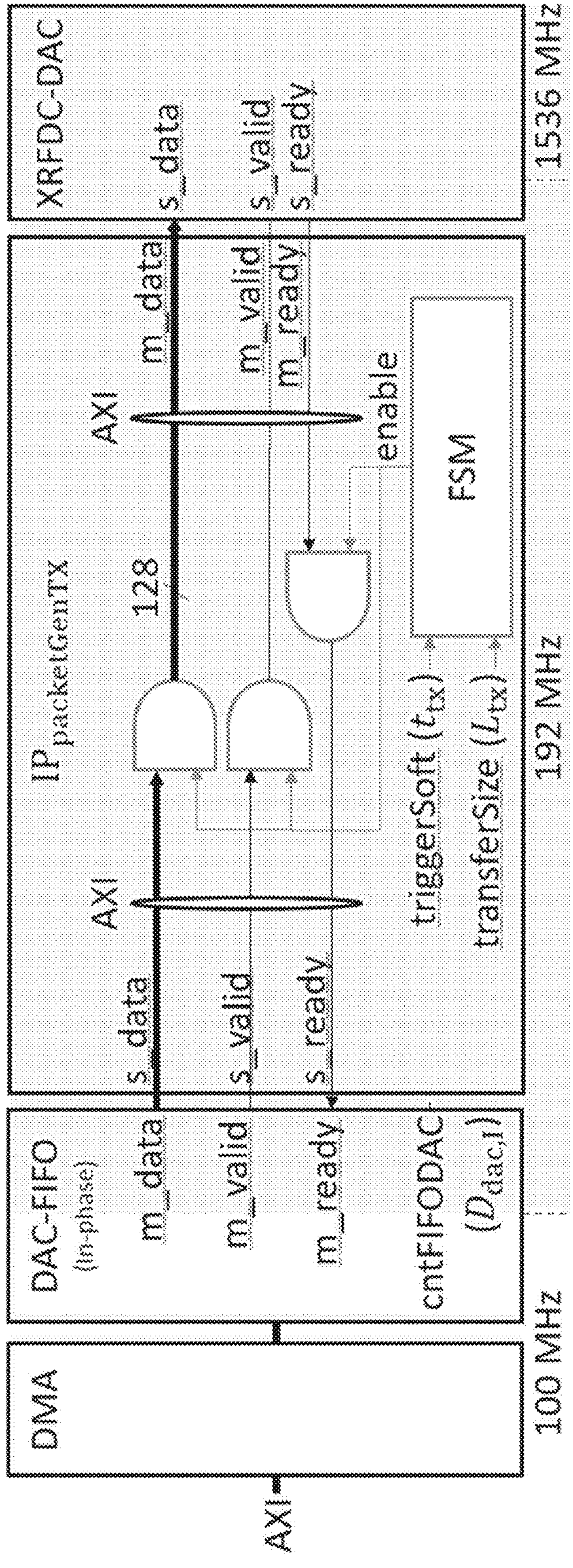
FIGS. 2(*a*)-2(*d*) are respective block diagrams of presently disclosed developed IPs, illustrating (a) $IP_{packetGenTX}$, (b) $IP_{packetGenRX}$, (c) $IP_{monitor}$, and (d) $IP_{detector}$, respectively.
Figure 2B:
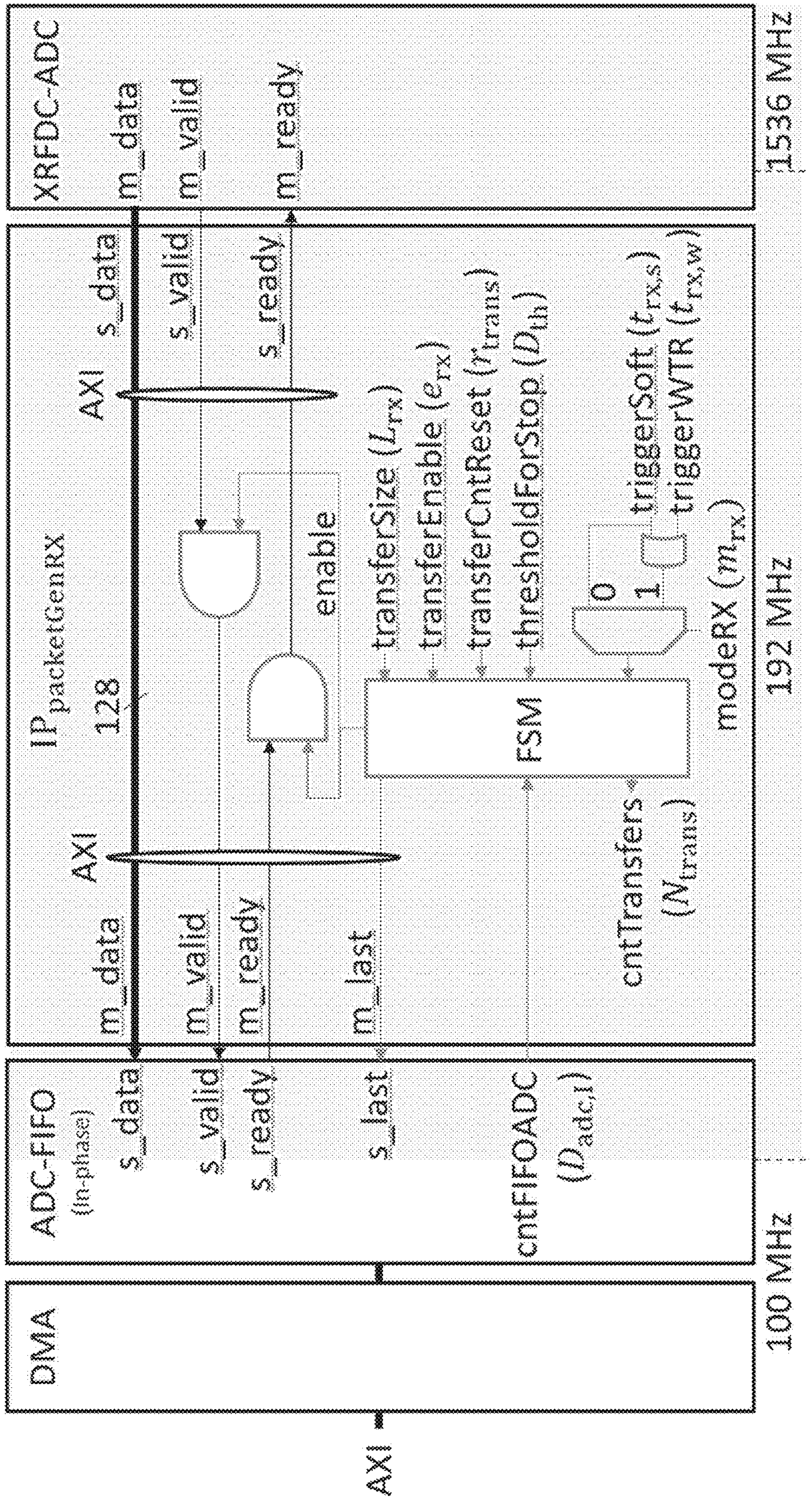
Figure 2C:
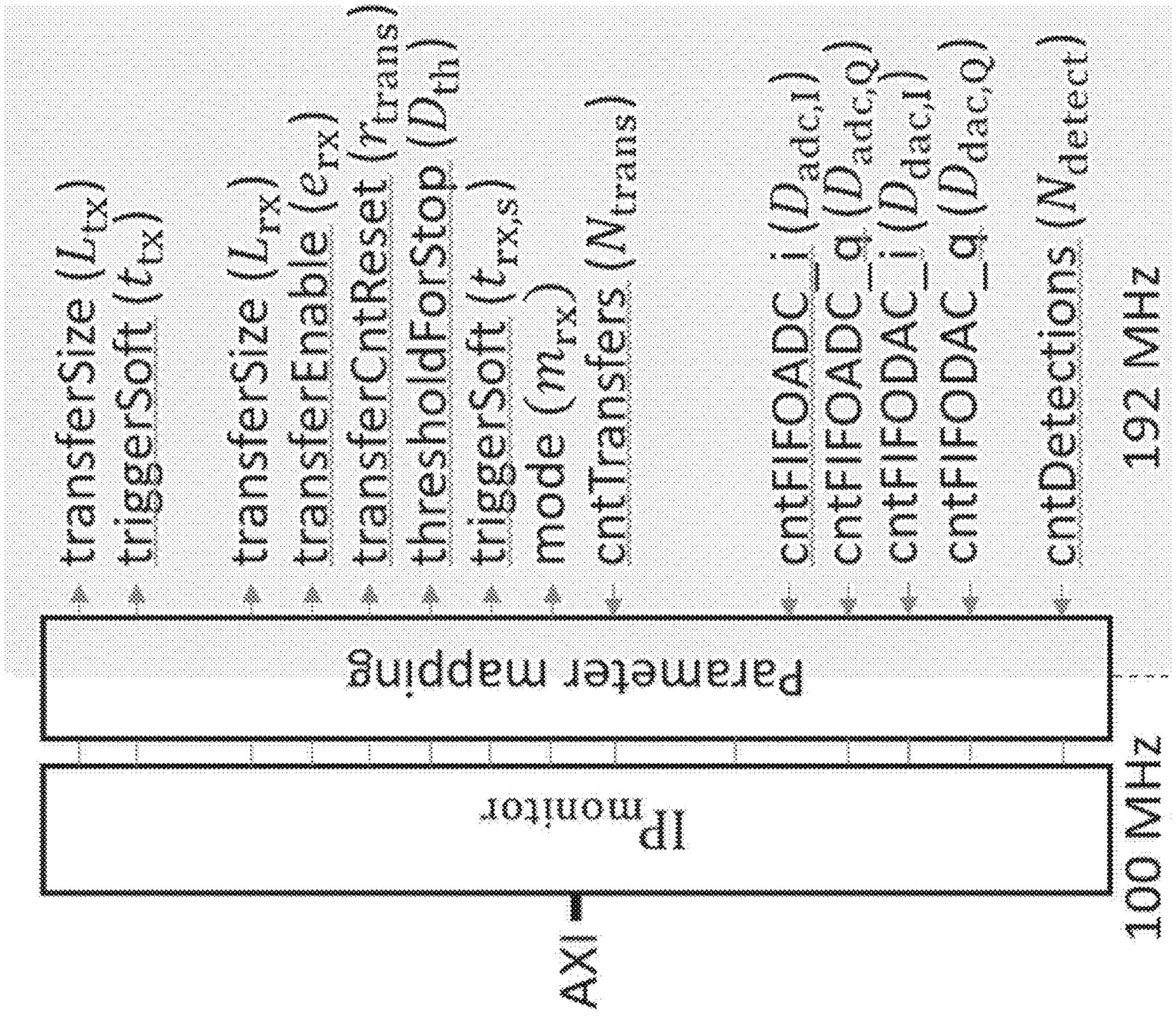
Figure 2D:
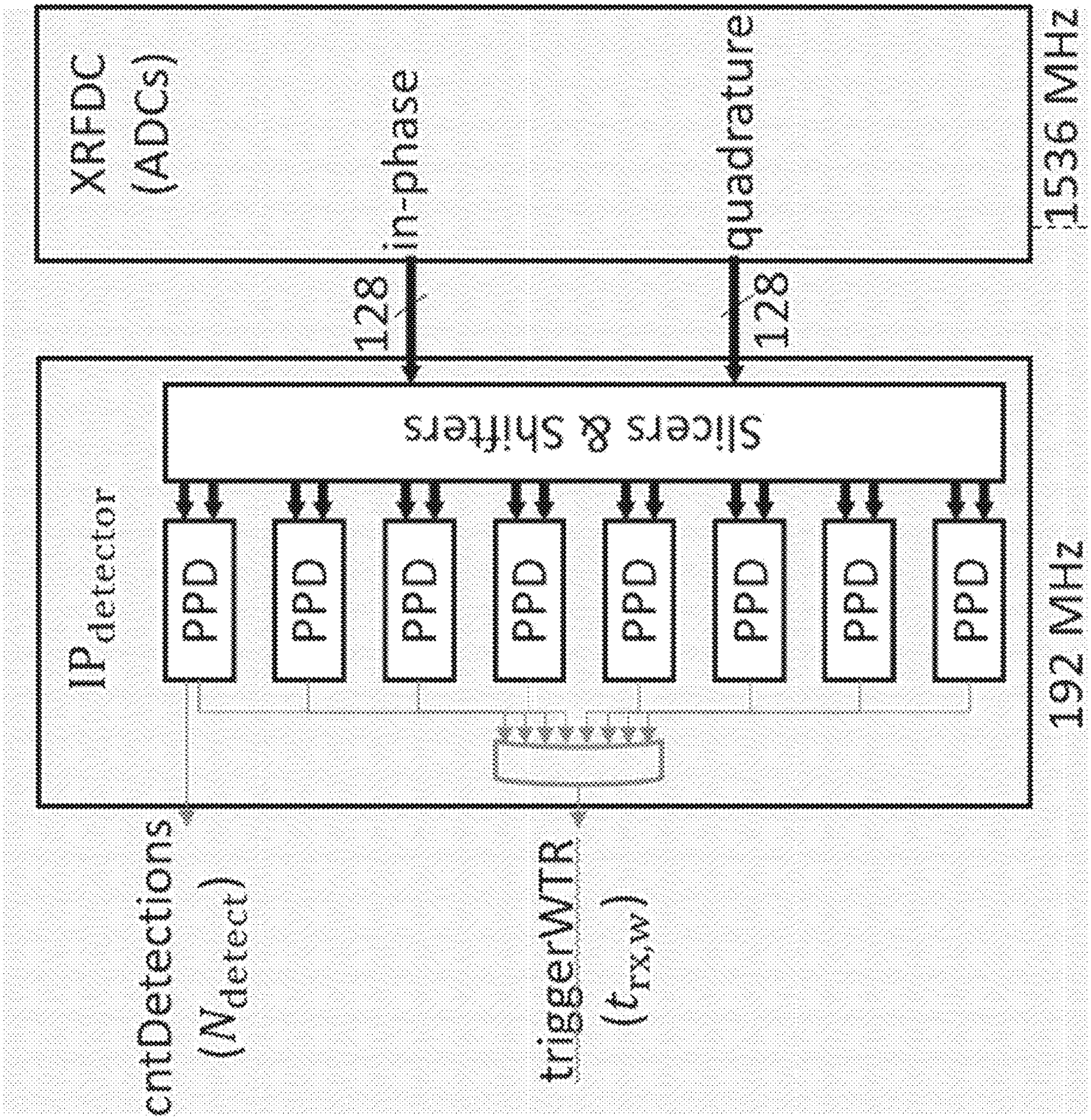

An exemplary embodiment of a mmWave SDR that can be built in accordance with this disclosure uses for example a Sivers EVK06002 evaluation kit (a platform for evaluating and validating mmWave-based communications) and for example an RFSoC2x2 FPGA board, as represented by the exemplary block diagram of architecture as represented in FIG. 1(*a*). FIG. 1(*b*) is an image of example of the implemented SDR, with the subject mmWave radio used with a 12-V battery. Such board is a Xilinx brand Radio Frequency System-on-Chip (RFSoC) device, which combines high-accuracy analog-to-digital converters (ADCs) and digital-to-analog converters (DACs) operating at Giga samples per second with programmable heterogeneous compute engines, particularly for academic usage. Such an arrangement provides an application programming interface (API) for CC-based baseband signal processing. However, the disclosed solutions, i.e., WTR and/or buffering method, may be used in other SDR platforms, e.g., USRP, Adalm Pluto, etc., and other frequency bands including ones below 6 GHz.

Further, more particularly, EVK06002 is an evaluation kit that converts the continuous-time baseband in-phase and quadrature signals to the passband or vice versa. It hosts a BFM06010 RF module that integrates two phased-antenna arrays (PAAs) for transmission and reception, respectively, with a TRX BF/01 transceiver, i.e., a homodyne IQ modulator/demodulator. Each PAA provides 16 channels, where each channel is wired to 4 patch antennas. The TRX BF/01 can be tuned within the range 57-71 GHz and does not need an extra local oscillator (LO). It can also store 64 custom antenna weighting vectors (AWVs), by which the phases of in-phase and quadrature components for each channel can be controlled between −1 to 1 with the resolution of 6 bits. All the features of TRX BF/01 can be controlled via a universal serial bus (USB) interface over an FTDI4232 chipset or the pin connections on EVK06002 with a custom serial peripheral interface (SPI). The kit provides differential-ended in-phase and quadrature signals. The presently disclosed exemplary arrangement uses four wide-band baluns, i.e., TI ADC-WB-BB, to convert them to single-end signals.

RFSoC2x2 is a field-programmable gate array (FPGA) board that features Zynq Ultra-Scale+XCZU28DR. The FPGA has built-in eight 12-bit ADCs and eight 14-bit digital-to-analog converters (DACs) with the maximum sample rate of 4.096 Gsps and 6.554 Gsps, respectively. The board provides connections to two of the ADCs and two of the DACs through SMA connectors. Hence, it allows one to synthesize signals up to 4.096 GHz bandwidth around the carrier with an IQ modulator/demodulator. Also, the FPGA integrates Arm Cortex-A53 64-bit quad-core processor and supports PYNQ, i.e., an open-source linux-based system that facilitates the interaction between the FPGA design, i.e., programmable logic (PL), with a custom software, i.e., PS. PYNQ runs on Cortex-A53 and supports Python language.

In the mm Wave SDR design, RFSoC2x2 is responsible for the following tasks: 1) Generating the in-phase and quadrature signals based on the IQ samples to be transmitted. 2) Acquiring a desired number of IQ samples by sampling the baseband in-phase and quadrature signals. 3) Configuring and controlling EVK06002 over a USB port. 4) Providing a Transmission Control Protocol/Internet Protocol (TCP/IP)-based API for CC. These tasks are managed by the objects FPGActrl, EVKctrl, and API, running in PYNQ. For the first and second tasks, FPGActrl interacts with the IPs in the PL via advanced extensible interface (AXI). It manages multi-tile synchronization (MTS) with a specific clock distribution, IQ data acquisition or transmission, and WTR. For the third task, EVKctrl uses publicly available PyFtdi library and provides a basic set of functions to read and set the registers of EVK06002. For the last task, API uses socket library and establishes a TCP/IP connection with CC. It provides a set of instructions to the CC to control the radio.

III. Programmable Logic and System Design

In this section, we introduce the developed IPs and discuss how they are utilized in the mmWave SDR. In addition to Xilinx RF data converter (XRFDC) (contains both ADCs and DACs), Xilinx AXI first-in-first-out (FIFO), and Xilinx AXI direct-memory access (DMA) blocks, we develop four main IPs to maximize the flexibility of the mmWave SDR. FIGS. 2(*a*)-2(*d*) are respective block diagrams of presently disclosed developed IPs, illustrating (a) $IP_{packetGenTX}$, (b) $IP_{packetGenRX}$, (c) $IP_{monitor}$, and (d) $IP_{detector}$, respectively. $IP_{packetGenTX}$ controls the IQ data transfer from the DAC FIFOs to the XRFDC. $IP_{packetGenRX}$ manages the IQ data transfer from the XRFDC to the ADC FIFOs. $IP_{detector}$ detects the trigger waveform for WTR. $IP_{monitor}$ configures and reads the registers of $IP_{packetGenRX}$, $IP_{packetGenTX}$, $IP_{detector}$ and FIFOs. We use MATLAB HDL Coder Toolbox to develop each IP. The input/output ports of these IPs are also shown in FIGS. 2(*a*)-2(*d*) and their functions are described in the following subsections.

We consider a clock distribution that allows the ADCs (or DACs) on different tiles of XRFDC to sample the in-phase and quadrature signals (or to convert the IQ samples to continuous-time signals), simultaneously. To this end, we use the MTS feature of Xilinx RFSoCs and generate the two reference clocks (i.e., analog and digital reference clocks) at $f_{ref}$=32 MHz, $f_{PL}$=192 MHz for PL, and $f_{sample}$=1.536 GHz for the sample clocks. Xilinx recommends the reference clocks for MTS to be less than 10 MHz. For the presently disclosed subject matter, MTS is maintained more accurately for 32 MHz. The reference clocks are utilized to measure the latency and offset between the sampling instances of ADCs (or DACs) based on Xilinx's guidelines on MTS. We set the decimation and interpolation factors to 1. Hence, the sample rate of the ADCs and the DACs are 1.536 Gsps. As a result, the clock distribution allows the mmWave SDR to transmit or receive an arbitrary waveform with 1.536 GHz bandwidth maximum at Nyquist rate with an IQ modulator.

It is worth nothing that the XRFDC operates with a clock rate that is $R \sim f_{sample}/f_{PL}=8$ times faster than the one for the PL. Hence, $IP_{packetGenTX}$ and $IP_{packetGenRX}$ pushes or pulls R=8 in-phase and quadrature samples concurrently for each PL clock, where each sample is represented with 16 bits. If a higher $f_{sample}$ is needed for a specific experiment, either more parallel structures need to be introduced to the PL or $f_{PL}$ needs to be increased to keep R constant, i.e., a trade-off between the FPGA resources and the clock rate.

A. Transmission

For the transmission, we employ two AXI FIFOs, i.e., DAC-FIFOs, for in-phase and quadrature samples, where their depths and widths are set to $D_{FIFO}=2^{15}$ and $W_{FIFO}=16$ R bits, respectively. Hence, the mm Wave SDR ensures the transmission of an IQ data of length $2^{18}$ without an underflow. The steps for transmitting S1×IQ samples are as follows:

Step 1: FPGActrl pads rem($S_{tx}$, R) zeroes to the IQ data, where r=rem($S_{tx}$, R) denotes the least positive remainder.

Step 2: FPGActrl writes the padded IQ data samples to the DAC-FIFOs via DMAs.

Step 3: FPGActrl sets the transfer size $L_{tx}$ as $\lceil S_{tx}/R \rceil$

Step 4: FPGActrl triggers the transmission with the rising-edge of tx, i.e., by changing its state from 0 to 1.

Step 5: With the trigger, $IP_{packetGenTx}$ enables XRFDC to read R IQ samples for $L_{tx}$ times from the DAC-FIFOs.

Transmissions are initiated by the PS. Also, FPGActrl sets or reads the registers $L_{tx}$ and $t_{tx}$ via $IP_{monitor}$.

B. Reception

Similar to the transmission, two AXI FIFOs, called ADCFIFOs, for in-phase and quadrature samples are employed, where their depths and widths are $D_{FIFO}=2^{15}$ and WFIFO=16 R bits, respectively. Hence, an IQ data of length $2^{18}$ can acquired without an overflow. We introduce two modes, i.e., software-triggered reception (STR) and WTR, controlled by the flag $m_{rx}$, as follows:

1) Software-triggered reception: If $m_{rx}$ is set to 0, the data acquisition is triggered by the PS. This mode is useful for the measurement of existing signals in the environment. In this mode, $S_{rx}$ IQ samples are received via the following steps:

Step 1: FPGActrl sets the transfer size $L_{rx}$ as $\lceil S_{rx}/R \rceil$ and enables the acquisition by setting the flag $e_{rx}$ to 1.

Step 2: FPGActrl triggers the acquisition with the rising-edge of $t_{rx,s}$.

Step 3: With the trigger, $IP_{packetGenRx}$ enables ADC-FIFOs to pull R IQ samples for $L_{rx}$ times.

Step 4: $IP_{packetGenRx}$ marks the last sample via mlast flag.

Step 5: FPGActrl reads the IQ data samples from the ADC-FIFOs via DMAs.

Step 6: FPGActrl drops the last rem($S_{tx}$, R) samples to match with $S_{rx}$.

2) Waveform-triggered reception: For $m_{rx}=1$, the acquisition is intended to be triggered by $IP_{detector}$ upon the detection of waveform $x_{sync}$. For $m_{rx}=1$, the acquisition can be still triggered by the PS via $t_{rx,s}$ since this feature can be useful for certain applications or tests. The steps for WTR are as follows:

Step 1: FPGActrl configures the transfer size $L_{rx}$ for each transfer and set the threshold $D_{th}$ to avoid overflow.

Step 2: The $IP_{detector}$ constantly searches for the trigger waveform with a set of poly-phase detectors (PPDs). If one of the PPDs detects the trigger waveform $x_{sync}$, it rises $t_{rx,w}$.

Step 3: With the trigger, if there is enough room in the ADC-FIFOs, $IP_{packetGenRX}$ enables ADC-FIFOs to pull R IQ samples for $L_{rx}$ times. Hence, the $L_{rx}$R IQ samples following upon the detection instant are pulled to the ADC-FIFOs.

Step 4: $IP_{packetGenRx}$ marks the last sample and increases $N_{trans}$ by 1 to indicate the number of transfers to the PS.

Step 5: FPGActrl reads $N_{trans}$. If $N_{trans}>0$, FPGActrl can read the $N_{trans} \times L_{rx}$R IQ data samples from the ADCFIFOs via DMAs.

As compared to STR, the main difference of WTR is that the trigger source is the PL. Hence, the data flow needs to be managed by the PL. The PS sets $D_{th}=L_{rx} \times \lfloor D_{FIFO}/L_{rx} \rfloor$ and the PL checks if $D_{adc,l}<D_h$ holds to ensure that there is enough room in the ADC-FIFOs for the next transfer, where $D_{adc,l}$ is the read counter of one of the ADC-FIFOs. Note that FPGActrl can reset $N_{trans}$ via $r_{trans}$ and flush the ADC-FIFOs at any time. The registers $L_{rx}$, $t_{rx,s}$, $m_{rx}$, $e_{rx}$, $r_{trans}$, $D_{th}$, and $N_{trans}$ are set or read via $IP_{monitor}$.

a) Buffer mechanism for discontinuous transmissions: One of the unique features of the WTR is that it allows discontinuous transmissions, i.e., it enables ADC-FIFOs to store $N_{trans}=\lfloor D_{FIFO}/L_{rx} \rfloor$ transfers in the ADC-FIFOs, where the receptions depend on the transmission instants. This feature is particularly useful for increasing the speed for CC-based beam sweeping. For example, consider a scenario where the transmitter transmits a set of IQ samples of length 1024 to identify the best AWV in a beambook of size 64. Let the IQ samples encode the utilized AWV index. By transmitting the corresponding waveform along with the trigger waveform at different times and using WTR at the receiver for $L_{rx} \geq 256$, among 64 transmissions, only the ones detected by the PPDs are written to the ADC-FIFOs. Once the transmissions are completed, the CC at the receiver side reads $N_{trans}$ (i.e., Step 5 in Section III-B2) to identify how many successful receptions (or transfers) have occurred. By pulling and processing the corresponding IQ data samples, the CC can decode the beam indices and identify the best AWV at the transmitter without continuously monitoring the IQ samples. We use this scenario for our experiment as discussed in Section IV.

b) Trigger waveform and detector: We design the trigger waveform xsvNc and its detection based on the strategy in [7]. In this method, the sequence $x_{sync}$ is a single-carrier (SC) waveform with the roll-off factor of $\beta=0.5$ synthesized by upsampling a repeated binary phase shift keying (BPSK) modulated sequence, i.e., 2[g, g, g, g]−1, by a factor of $N_{up}=4$ and passing it through a root-raised cosine (RRC) filter, where $g=[g_0, \ldots, g_{31}] \in R^{1 \times 32}$ is a binary Golay sequence. As a result, the null-to-null bandwidth of $x_{sync}$ is equal to $(1+\beta)/N_{up} \times f_{sample}=3/8 \times f_{sample}=576$ MHz. In [7], the design of $x_{sync}$ is motivated as follows: 1) A cross-correlation operation with this waveform can be realized by using an approximate waveform where its samples are either 1 or −1. This feature leads to a better utilization of FPGA resources since the multiplications can be reduced to the additions or subtractions. 2) By detecting the presence of shorter sequence g back-to-back four times, the distortion due to the carrier frequency offset can be circumvented. 3) A smaller dynamic range with SC waveform requires less power back-off. The metric that used for the detection of g can be expressed as:

$$m_n \triangleq \frac{1}{\|b\|^2}\frac{|\rho_n|^2}{|r_n|^2} = \frac{1}{\|b\|^2}\frac{\langle x_n, b\rangle^2}{\langle x_n, x_n\rangle^2} = \frac{\langle x_n, b\rangle^2/2^{14}}{\|x_n\|^2}, \quad (1)$$

where $b=[b_0, b_1, \ldots, b_{127}]$ is based on the aforementioned approximate SC waveform with the rectangular filter and equal to $b=2[g_{31}, g_{31}, g_{31}, g_{31}, g_{30}, g_{30}, g_{30}, g_{30}, \ldots, g_0, g_0, g_0, g_0]-1$ for $N_{up}=4$ and $x_n=[x_n, x_{n-1}, \ldots, x_{n-127}]$, where $x_n$ is the nth received IQ sample.

A PPD declares a detection if $m_n$ is larger than ¼ for four times with 128 samples apart. We also implement a counter for the first PPD to monitor the number of detection events, i.e., $N_{detect}$, for test purposes.

XRFDC provides R in-phase and quadrature samples concurrently for each PL clock due to the difference between the PL clock and ADC sample rate. Hence, we implement the cross-correlation operation in (1), i.e., $\langle x_n, b\rangle$, as a finite impulse response (FIR) filter and exploit the following identity to calculate the result for every other R=8 samples:

$$\rho_n = \sum_{k=0}^{127} b_k x_{n-k} = \sum_{l=0}^{7} \rho_{n,l}, \quad (2)$$

$$\text{for } \rho_{n,l} = \sum_{k=0}^{15} b_{8k+l} x_{n-8k-l}.$$

Figure 3:
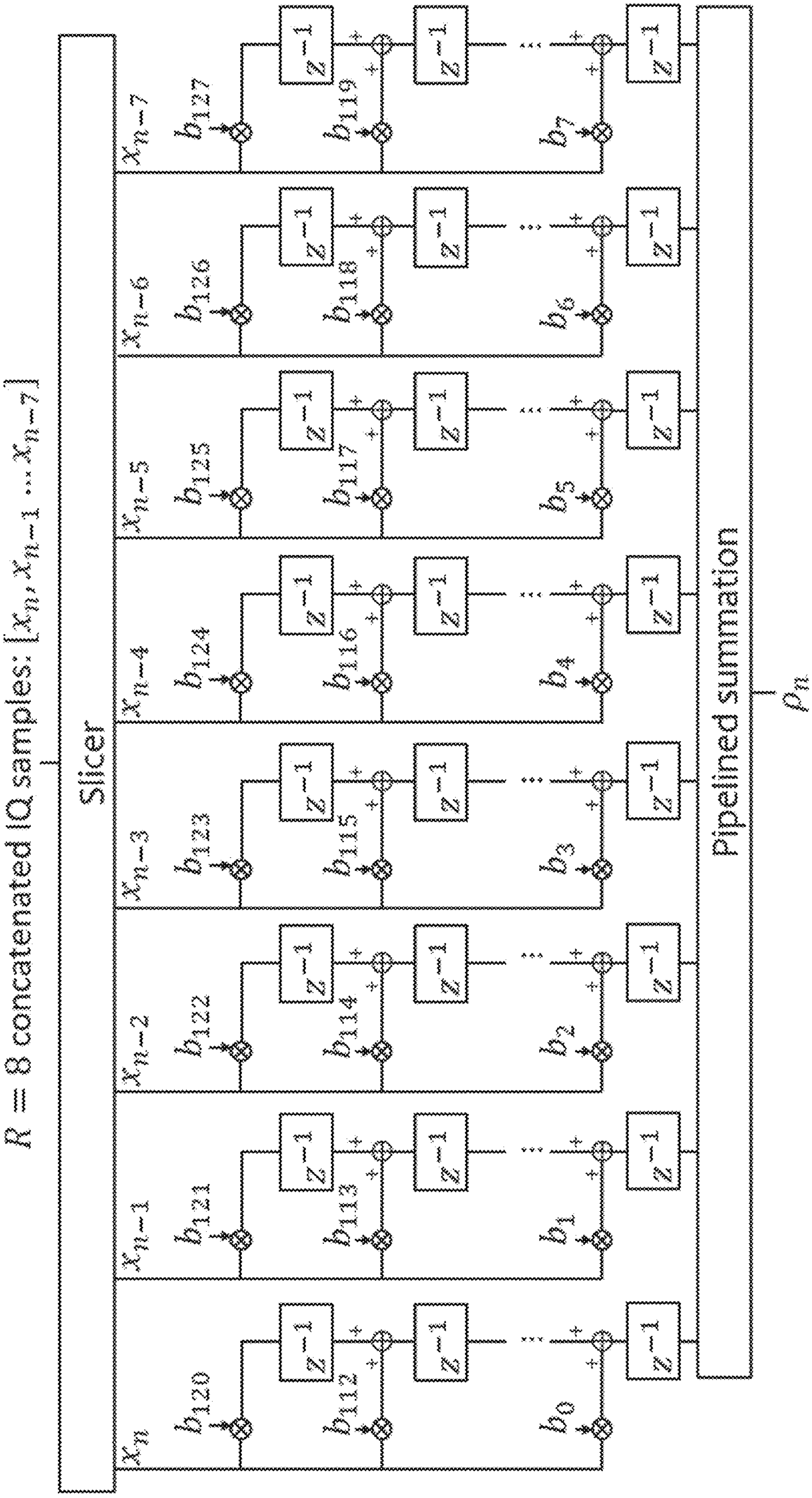
FIG. 3 diagrammatically illustrates an exemplary cross-correlation implementation in a poly-phase detector (PPD) in accordance with presently disclosed subject matter.

As can be seen from (2), for each PL clock, $\rho_n$ can be obtained by summing the outputs of 8 sub-FIR filters, i.e., $\rho_{n,l}$, where the input of the lth sub-filter is the lth sample of R IQ samples provided by XRFDC. We implement the FIR filter by using the transposed form of each sub-filter with pipelining, as illustrated in FIG. 3. In particular, FIG. 3 diagrammatically illustrates an exemplary cross-correlation implementation in a poly-phase detector (PPD) in accordance with presently disclosed subject matter. To detect $x_{sync}$, we use R=8 parallel PPDs that operate on different lags. If one of the PPDs detect $x_{sync}$, the flag $t_{rx,w}$ is raised.

C. Application-Programming Interface

The CC interacts with the mm Wave SDR via the instruction set defined in the API object. We define two TCP/IP ports for control and data. While control port is utilized to transfer commands and acknowledgments, the data port is utilized to exchange IQ samples. With the developed API, the AWVs, AWV indices, carrier frequency, and gains can be controlled by the CC.

Figure 4A:
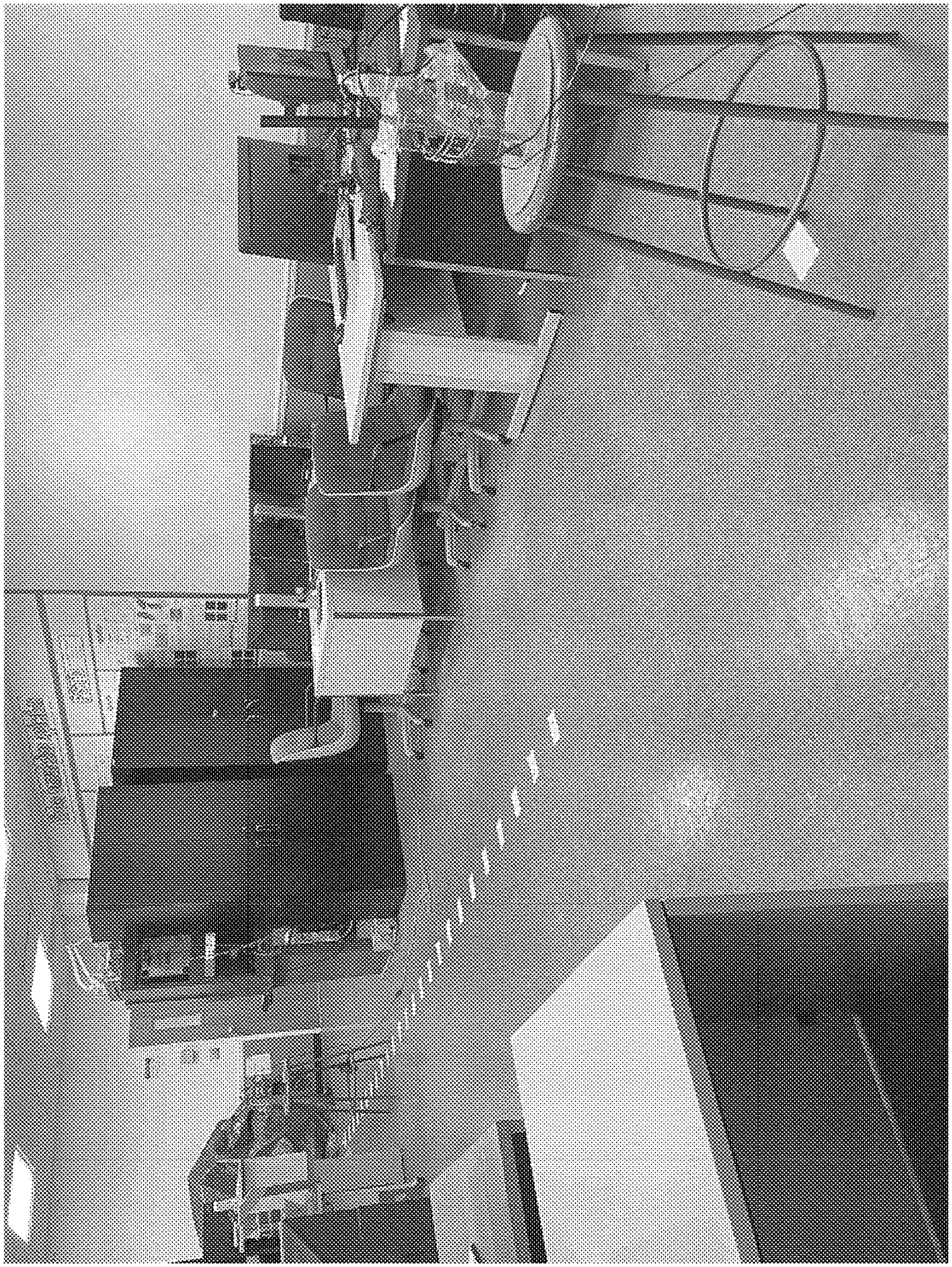
FIGS. 4(*a*) and 4(*b*) represent an experimental setup in accordance with presently disclosed subject matter, with FIG. 4(*a*) specifically showing an image of an exemplary experiment setup, and FIG. 4(*b*) diagrammatically illustrating in block diagram, exemplary connections in such presently disclosed experiment.
Figure 4B:
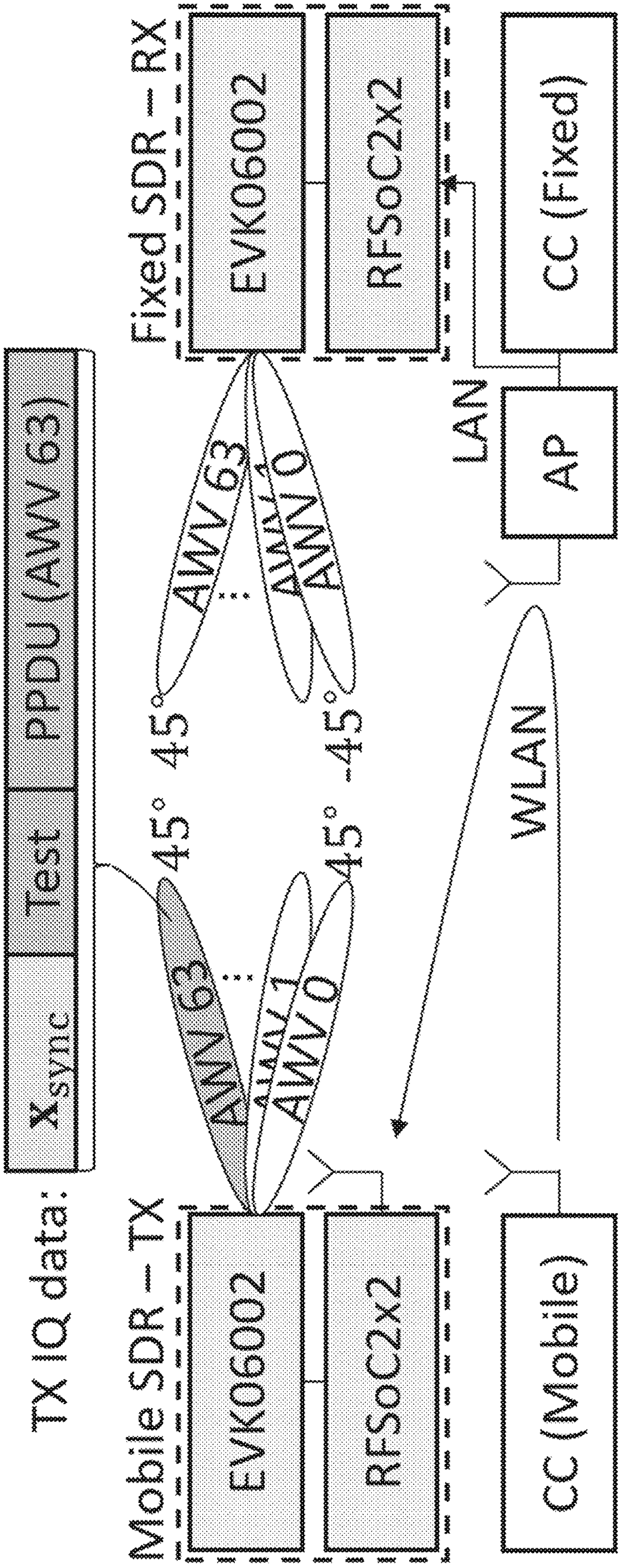

IV. Demonstration of WTR and the Buffering Method for Discontinuous Transmission In this disclosure, we demonstrate the WTR and the buffering method for discontinuous transmission with a beam sweeping experiment in an in-door office environment. FIGS. 4(*a*) and 4(*b*) represent such experimental setup in accordance with presently disclosed subject matter, with FIG. 4(*a*) specifically showing an image of the exemplary experiment setup, and FIG. 4(*b*) diagrammatically illustrating in block diagram, exemplary connections in such presently disclosed experiment.

In the experiment, we use one fixed SDR and a mobile SDR, where the SDRs face each other, as can be seen in FIG. 4(*a*). Each SDR is controlled by a CC over an access point (AP). As illustrated in FIG. 4(*b*), the mobile SDR is controlled over the wireless local-area network (WLAN) since a wireless control allows us to adjust the mobile SDR's position conveniently in the experiment. We reduce the link distance between the SDRs, denoted by d, from 9.75 m to 2.44 m with a spacing of 12" (i.e., 25 locations). We use the default set of 64 AWVs for $f_c$=60.48 GHz, provided by Sivers, sweeping the azimuth between −45° and 45° uniformly. Hence, in total, there exist 4096 TX-RX AWV index pairs one can choose for the mm Wave link. Our goal with the experiment is to evaluate the signal-to-noise ratio (SNR) for each pair at different locations for two carrier frequencies, i.e., $f_c \in \{60.48, 65.34\}$ GHz.

We implement the following routine to calculate the SNR for a given TX-RX AWV index pair: The CC of the mobile SDR first sets the TX AWV index. It then generates an orthogonal frequency division multiplexing-based physical layer protocol data unit (PPDU) [7], where the data bits indicate the utilized TX AWV index. The PPDU length is 1280 complex samples. The CC transmits the PPDU along with a test waveform and the trigger waveform $x_{sync}$, where the test waveform consists of a ramp waveform (50 samples), zero samples (25 samples), a tone (50 samples), and zero samples (25 samples) for evaluating potential impairments, visually. After the transmission, the CC increases the TX AWV index and repeats the aforementioned announcement procedure. In our experiment, the CC completes the announcements of 64 TX AWV indices in less than 2 sec. The fixed SDR utilizes WTR. The corresponding CC first sets the RX A WV index. It waits for 2 sec and reads $N_{trans}$. For each transfer, it then pulls the corresponding IQ samples (1580 samples) and tries to decode the PPDU. If the decoding is successful, the CC detects announced TX AWV index and measures the SNR. It is worth noting we do not implement any exhaustive correlation in the CC to find the transmitted PPDU, thanks to the WTR. With this procedure, we record the IQ data for all transfers for a given RX A WV index, location, and $f_c$ and generate a dataset.

Figure 5A:
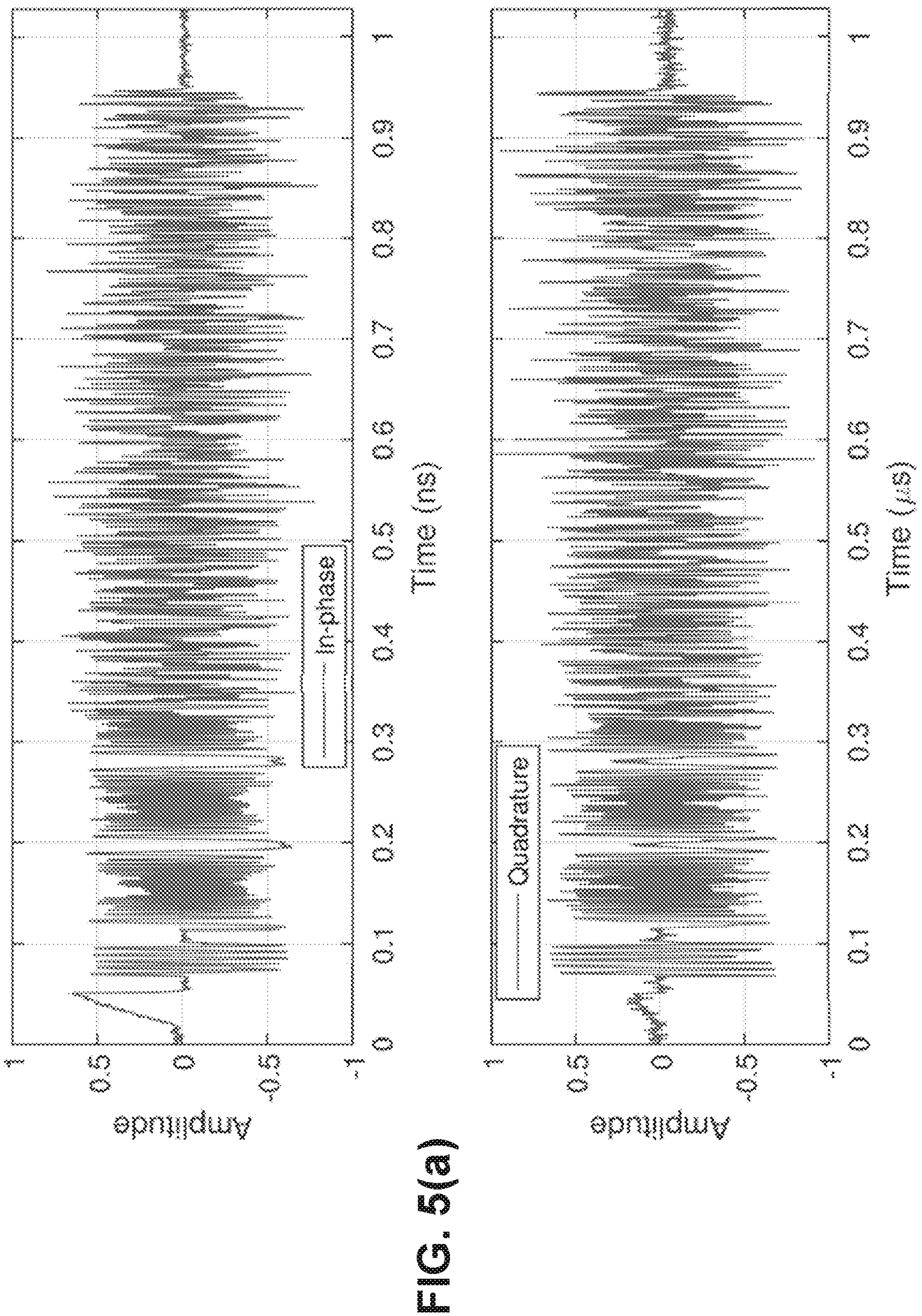
FIGS. 5(*a*) and 5(*b*) graphically represent examples of received in-phase/quadrature (IQ) data samples in accordance with presently disclosed subject matter, with a transfer and its analysis, with FIG. 5(*a*) specifically showing graphs of the received IQ samples, with the test waveform and physical layer protocol data unit (PPDU) data shown (with a detected TX antenna weighting vector (AWV) index of 31), and with FIG. 5(*b*) graphically illustrating the magnitude and phase graphs of the measured channel frequency response (CFR), with the measured SNR at 25.76 dB.
Figure 5B:
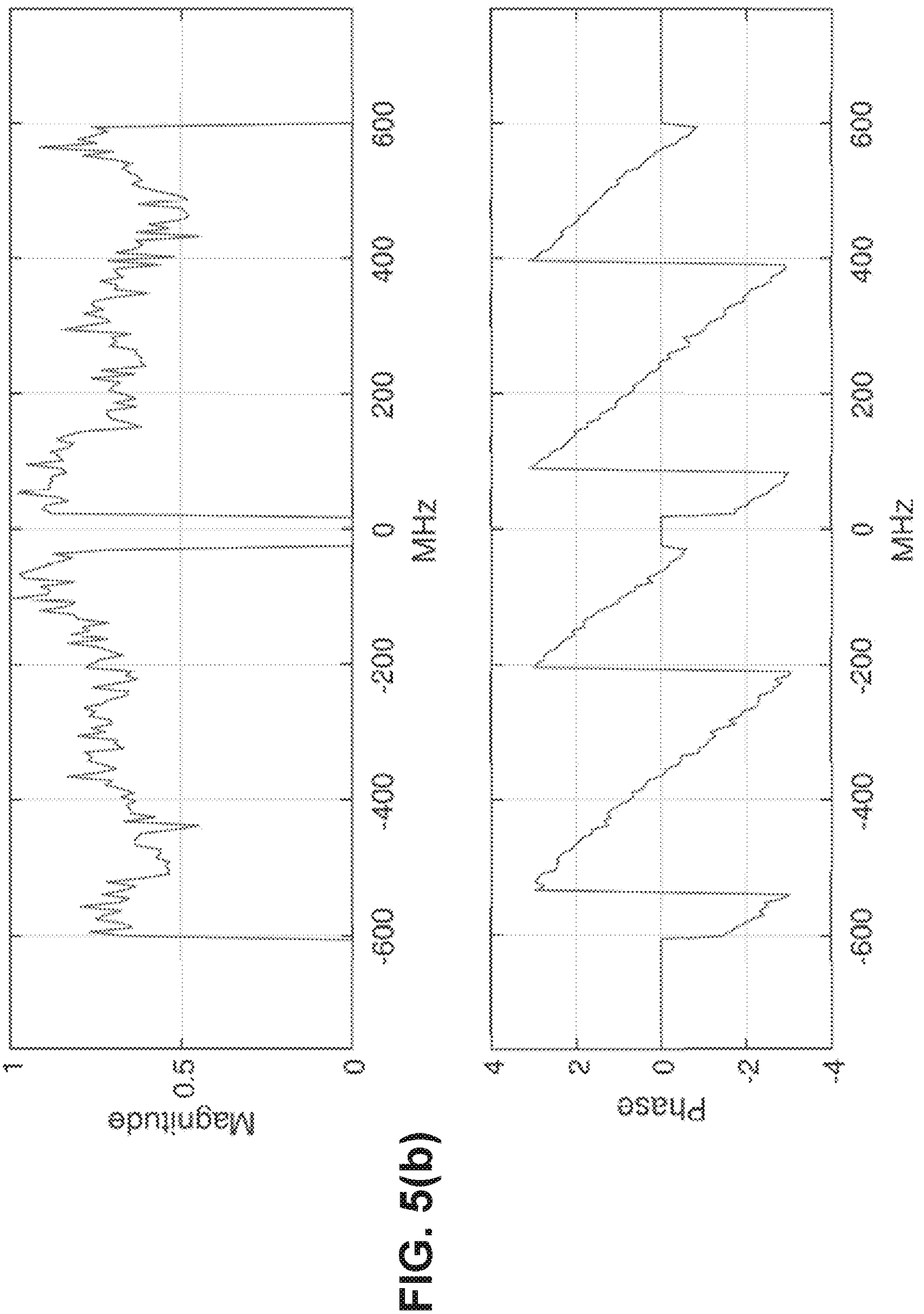

FIGS. 5(*a*) and 5(*b*) graphically represent examples of received in-phase/quadrature (IQ) data samples in accordance with presently disclosed subject matter, with a transfer and its analysis.

In particular, FIGS. 5(*a*) and 5(*b*) show, as an example, the received IQ data samples and the measured channel frequency response (CFR) for the 29th transfer when the RX antenna weighting vector (AWV) is 31 and the link distance is 9.75 m. After decoding the PPDU, TX antenna weighting vector (AWV) index is detected as 31 and the measured SNR is calculated 25.76 dB. The measured CFR is relatively flat, where the gap in the measurement is due to the null DC subcarriers. At the beginning of the IQ data, we also observe the test waveform.

Figure 6A:
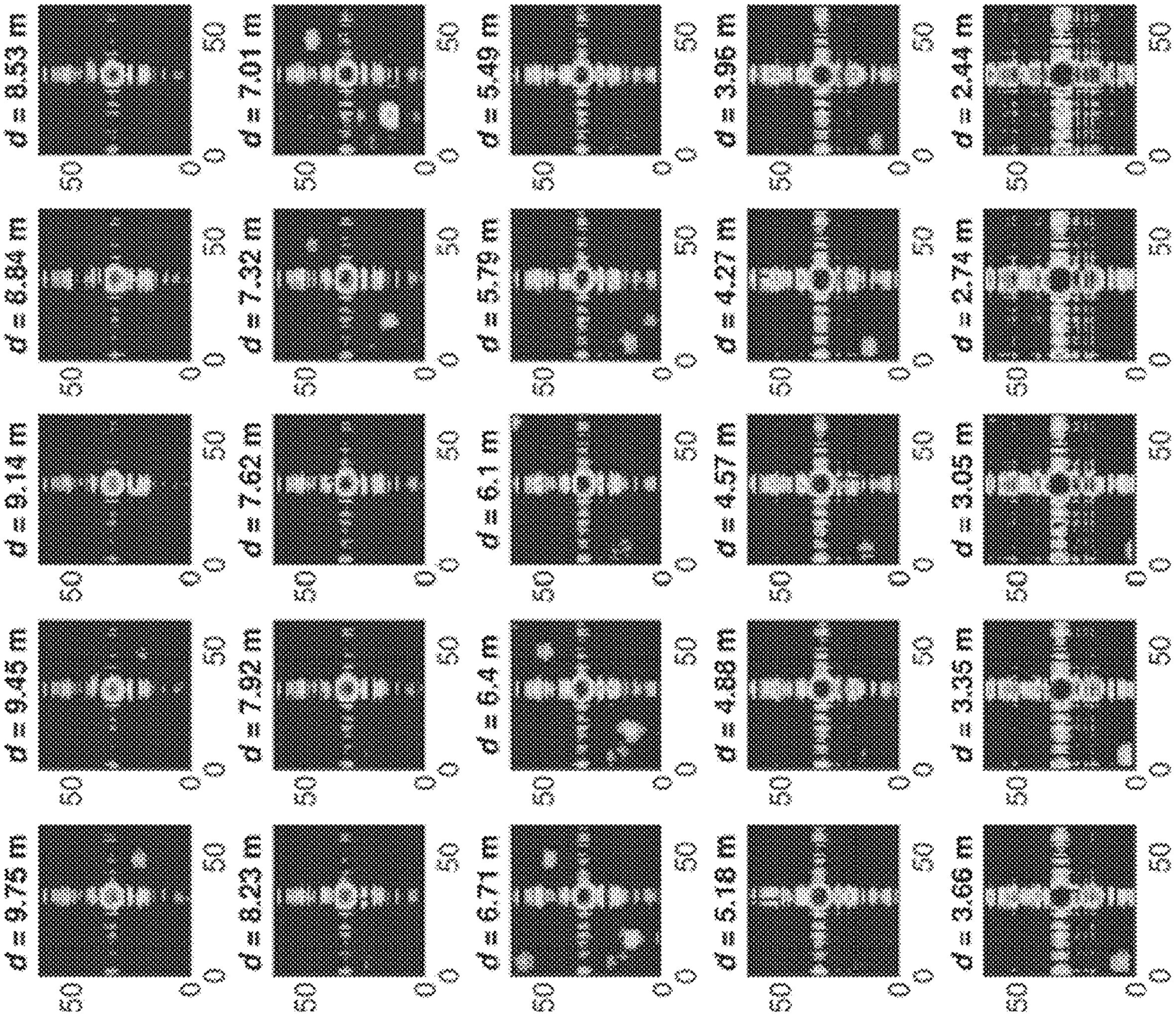
FIGS. 6(*a*) and 6(*b*) graphically illustrate (through graded colors or gray-scale) the SNR for a given RX AWV index (x-axis) and TX AWV index (y-axis) for different link distances, with FIG. 6(*a*) results associated with a carrier frequency of $f_c$=60.48 GHz, and with FIG. 6(*b*) results associated with a carrier frequency of $f_c$=65.34 GHz.
Figure 6B:
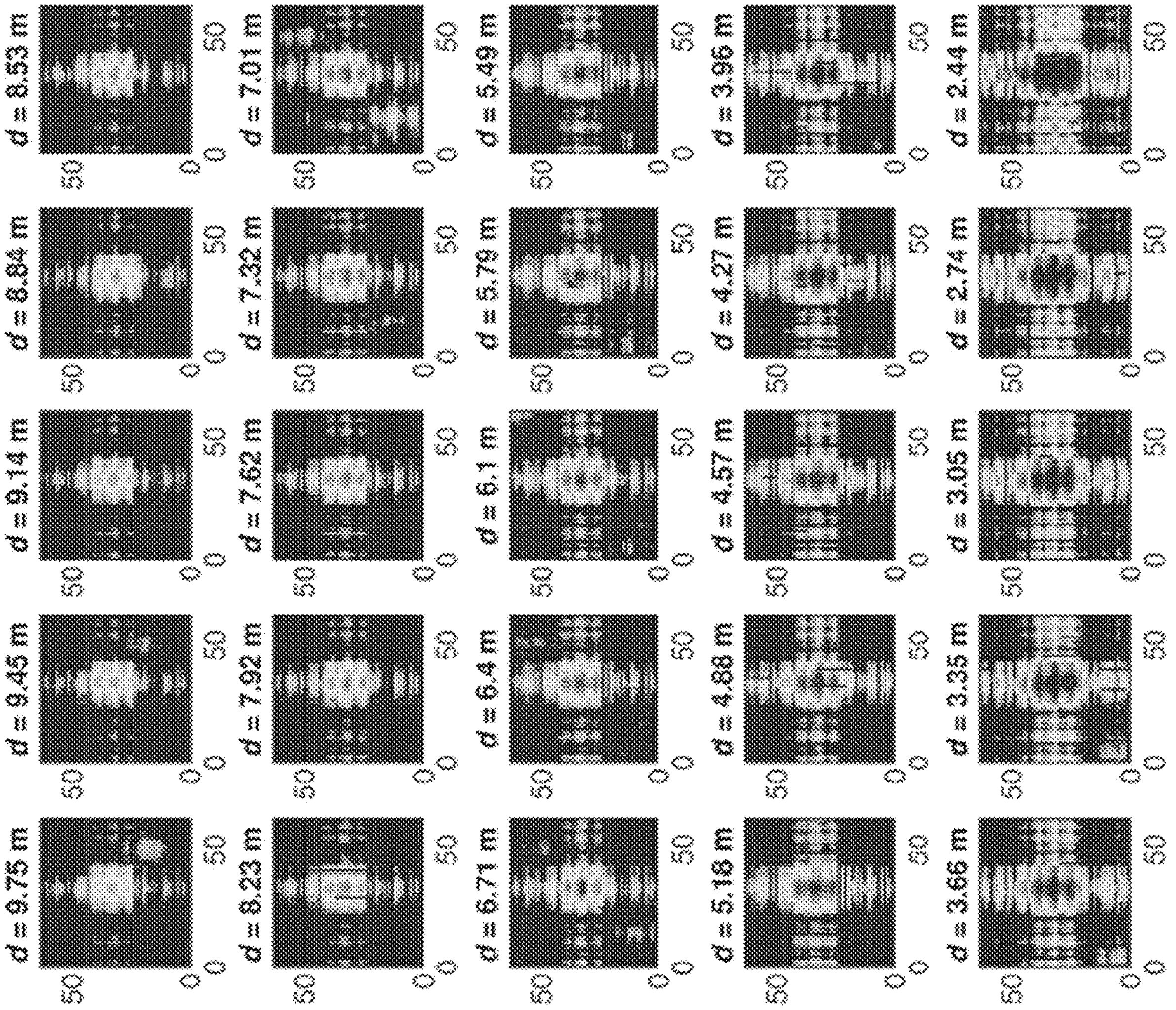

In FIGS. 6(*a*) and 6(*b*), we provide the SNRs for a given TX-RX AWV index pair at different locations. FIGS. 6(*a*) and 6(*b*) graphically illustrate (through graded colors or gray-scale) the SNR for a given RX AWV index (x-axis) and TX AWV index (y-axis) for different link distances, with FIG. 6(*a*) results associated with a carrier frequency of $f_c$=60.48 GHz, and with FIG. 6(*b*) results associated with a carrier frequency of $f_c$=65.34 GHz. We can infer the following: First, the SNR can reach up to 30 dB when the beams are well-aligned, e.g., when the RX AWV and TX AWV indices are around 32, i.e., 0 degrees. Second, if the received signal is powerful, the receiver may not be able to decode the PPDU due to the saturation. We use fixed TX and RX gains in the experiment. Third, the link can still be maintained over a reflection. For instance, for $f_c$=60.48 GHz and d=7.01 m, it is possible to maintain the link if both TX AWV and RX AWV indices are set to 13, likely over a reflection due to the metal cabinets. Fourth, we observe a large difference in the SNR matrices when $f_c$ is switched to 65.34 GHz. Since we still use the AWVs for $f_c$=60.48 GHz, the beams are not focused for $f_c$=65.34 GHz. While the mismatch allows the link via the antenna side lobes, it becomes more blind to the reflections as the power is dispersed to the different angles.

V. Concluding Remarks

The presently disclosed subject matter relates to a mmWave software-defined radio (SDR) solution for experimentation in the 60 GHz band. The disclosure further introduces waveform-triggered reception (WTR) and a buffering approach for discontinuous transmission to achieve a flexible companion computer (CC) based baseband signal processing. We also generate a new dataset based on a beam sweeping approach. Some significant advantages of the disclosed SDR are that it is low cost, portable, and easy to construct.

While certain embodiments of the disclosed subject matter have been described using specific terms, such description is for illustrative purposes only, and it is to be understood that changes and variations may be made without departing from the spirit or scope of the subject matter.

REFERENCES

R. Zhao, T. Woodford. T. Wei, K. Qian, and X. Zhang, "M-Cube: A millimeter-wave massive MIMO software radio," in *Proc. ACM MobiCom, New York, NY, USA,* 2020.

T. Chen, P. Maddala, P. Skrinponis, J. Kolodziejski, X. Gu, A. Paidimarri, S. Rangan, G. Zussman, and I. Seskar, "Programmable and open-access millimeter-wave radios in the PAWR COSMOS testbed," in *Proc. ACM WiNTECH, New York, NY, USA,* 2021, pp. 1-8.

[3] J. 0. Lacruz, R. R. Ortiz, and J. Widmer, "A real-time experimentation platform for sub-6 GHz and millimeter-wave MINO systems," in *Proc, ACM MobiSys, New York, NY, USA,* 2021, pp. 427-439.

[4] R. Zavorka, R. Marsalek, J. Vychodil, Zoehmann., G. Ghiaasi, and J. Blumenstein, "Deep neural network-based human activity classifier in 60 GHz WLAN channels," in *Proc. IEEE GLOBECOM Workshops—Workshop on Propagation Channel Models and Evaluation Methodologies for* 6G, December 2022, pp. 1-6.

[5] N. N. Santhi. M. Polese. and T. Melodia, "An end-to-end programmable testbed for the experimental evaluation of video streaming at mm Waves," in *Proc. IEEE GLOBECOM Workshops—Workshop on High Capacity Wireless Communications*, December 2022, pp. 1-6.

[6] M. S. Sim, S. Ahuja, A. D. Wooseok Nam, Z. Fan, and T. Luo, "60 GHz mm Wave full-duplex transceiver study and over-the-air link verification," in *Proc. IEEE GLOBECOM*, December 2022, pp. 1-6.

[7] A. Sahin and R. Yang, "A demonstration of over-the-air-computation for FEEL," in *Proc. IEEE GLOBECOM Workshops—Workshop on Wireless Communications for Distributed Intelligence*, December 2022, pp. 1-6.

What is claimed is:

1. Methodology for a radio, comprising:

receiving an analog signal corresponding to a radio frequency waveform;

converting the analog signal to a digital signal corresponding to the radio frequency waveform;

acquiring data samples from the radio frequency waveform in a first mode of operation;

monitoring data samples from the radio frequency waveform at a programmable logic circuit for detecting a predetermined trigger waveform within the radio frequency waveform;

producing a triggering signal by the programmable logic circuit whenever the predetermined trigger waveform is detected; and initiating an acquisition of a predetermined number of subsequent data samples from the radio frequency waveform into a buffer in a second mode of operation whenever the triggering signal is produced, wherein the predetermined number of subsequent data samples comprises in-phase/quadrature (IQ) data samples following upon a detection instant of the predetermined trigger waveform.

2. The methodology according to claim 1, wherein the second mode of operation comprises forwarding the acquired in-phase/quadrature (IQ) data samples from the buffer to a programmable system.

3. The methodology according to claim 2, further comprising processing the forwarded in-phase/quadrature (IQ) data samples for transmission.

4. The methodology according to claim 1, wherein the programmable logic circuit comprises at least one of a field-programmable gate array (FPGA) or application-specific integrated circuit or integrated circuit (IC) layout design.

5. The methodology according to claim 1, wherein the programmable logic circuit comprises a poly-phase detector (PPD).

6. The methodology according to claim 5, wherein the poly-phase detector (PPD) comprises a set of poly-phase detectors in a cross-correlation implementation, such that any one of the set of poly-phase detectors can detect the predetermined trigger waveform, and produce the triggering signal.

7. The methodology according to claim 2, wherein the first mode of operation comprises acquiring data samples from the radio frequency waveform under the control of a programmable system.

8. The methodology according to claim 7, wherein the second mode of operation comprises forwarding the acquired in-phase/quadrature (IQ) data samples from the buffer to the programmable system.

9. The methodology according to claim 1, wherein the second mode of operation comprises initiating the acquisition of the predetermined number of in-phase/quadrature (IQ) data samples for a predetermined number of times.

10. The methodology according to claim 1, further comprising temporarily storing converted digital signals for processing prior to subsequent transmission, in order to create a receive and transmit buffer for discontinuous transmissions.

11. The methodology according to claim 1, further comprising using integrated two phased-antenna arrays (PAAs) for radio transmission and reception, respectively.

12. The methodology according to claim 11, further comprising using a software-defined transceiver having a homodyne in-phase/quadrature (IQ) modulator/demodulator.

13. The methodology according to claim 12, wherein:

the software-defined transceiver is tunable within a range of from 57 to 71 GHz; and each PAA provides a plurality of channels, where each channel is wired to a plurality of patch antennas.

14. The methodology according to claim 13, wherein the transceiver stores a plurality of custom antenna weighting vectors (AWVs), by which the phases of in-phase and quadrature components for each channel can be controlled.

15. The methodology according to claim 1, wherein the radio comprises a millimeter-wave software-defined radio (SDR), and the methodology further comprises using a plurality of the millimeter-wave software-defined radios (SDRs) in a set-up for wireless experimentation, with one SDR used as a fixed SDR and one SDR used as a mobile SDR.

16. The methodology according to claim 15, wherein each SDR comprises a homodyne transceiver providing a Transmission Control Protocol/Internet Protocol (TCP/IP)-based interface for interface with companion computer (CC)-based baseband signal processing, and each SDR is controlled by a CC over an access point (AP).

17. The methodology according to claim 1, wherein the radio comprises a millimeter-wave software-defined radio (SDR), and the methodology further comprises using the millimeter-wave software-defined radio (SDR) as an application programming interface (API) for companion computer (CC)-based baseband signal processing, with the SDR further comprising a Radio Frequency System-on-Chip (RFSoC) device, comprising high-accuracy analog-to-digital converters (ADCs) and digital-to-analog converters (DACs) operating at Giga samples per second with programmable heterogeneous compute engines.

18. A millimeter-wave software-defined radio (SDR), comprising:

at least one antenna for receiving an analog signal corresponding to a radio frequency waveform;

at least one analog to digital converter (ADC) converting the analog signal to a digital signal corresponding to the radio frequency waveform;

one or more processors programmed for:

acquiring data samples from the radio frequency waveform in a first mode of operation;

monitoring data samples from the radio frequency waveform at a programmable logic circuit for detecting a predetermined trigger waveform within the radio frequency waveform;

producing a triggering signal by the programmable logic circuit whenever the predetermined trigger waveform is detected; and initiating an acquisition of acquiring a predetermined number of subsequent data samples from the radio frequency waveform into a buffer in a second mode of operation whenever the triggering signal is produced, wherein the predetermined number of subsequent data samples comprises in-phase/quadrature (IQ) data samples following upon a detection instant of the predetermined trigger waveform.

19. The millimeter-wave software-defined radio (SDR) according to claim 18, wherein the second mode of operation further comprises forwarding the acquired in-phase/quadrature (IQ) data samples from the buffer to a programmable system.

20. The millimeter-wave software-defined radio (SDR) according to claim 19, wherein the one or more processors are further programmed for processing the forwarded in-phase/quadrature (IQ) data samples for transmission.

21. The millimeter-wave software-defined radio (SDR) according to claim 18, wherein the programmable logic circuit comprises at least one of a field-programmable gate array (FPGA) or application-specific integrated circuit or integrated circuit (IC) layout design.

22. The millimeter-wave software-defined radio (SDR) according to claim 18, wherein the programmable logic circuit comprises a poly-phase detector (PPD).

23. The millimeter-wave software-defined radio (SDR) according to claim 22, wherein the poly-phase detector (PPD) comprises a set of poly-phase detectors in a cross-correlation implementation, such that any one of the set of poly-phase detectors can detect the predetermined trigger waveform, and produce the triggering signal.

24. The millimeter-wave software-defined radio (SDR) according to claim 19, wherein the first mode of operation comprises acquiring data samples from the radio frequency waveform under the control of the programming of the one or more processors.

25. The millimeter-wave software-defined radio (SDR) according to claim 24, wherein the second mode of operation comprises forwarding the acquired in-phase/quadrature (IQ) data samples from the buffer to control of the programming of the one or more processors.

26. The millimeter-wave software-defined radio (SDR) according to claim 18, wherein the second mode of operation comprises initiating the acquisition of the predetermined number of in-phase/quadrature (IQ) data samples for a predetermined number of times.

27. The millimeter-wave software-defined radio (SDR) according to claim 18, wherein the one or more processors are further programmed for temporarily storing converted digital signals for processing prior to subsequent transmission, for providing a receive and transmit buffer for discontinuous transmissions.

28. The millimeter-wave software-defined radio (SDR) according to claim 18, further comprising integrated two phased-antenna arrays (PAAs) for radio transmission and reception, respectively.

29. The millimeter-wave software-defined radio (SDR) according to claim 28, wherein:

the one or more processors are further programmed for providing and operating a software-defined transceiver having a homodyne in-phase/quadrature (IQ) modulator/demodulator, tunable within a range of from 57 to 71 GHz; and each PAA provides a plurality of channels, and each channel is wired to a plurality of patch antennas.

30. The millimeter-wave software-defined radio (SDR) according to claim 29, the one or more processors are further programmed for storing a plurality of custom antenna weighting vectors (AWVs) for the transceiver, by which the phases of in-phase and quadrature components for each channel can be controlled.

31. The millimeter-wave software-defined radio (SDR) according to claim 18, further comprising providing a plurality of the millimeter-wave software-defined radios (SDRs) in a set-up for wireless experimentation, with one SDR used as a fixed SDR and one SDR used as a mobile SDR.

* * * * *